(12) United States Patent
Alexander et al.

(10) Patent No.: US 8,458,157 B2
(45) Date of Patent: Jun. 4, 2013

(54) SYSTEM AND METHOD OF FILTERING SEARCH RESULTS

(75) Inventors: Matthew Walker Alexander, Orlando, FL (US); Katherine Mirescu, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 599 days.

(21) Appl. No.: 11/864,795

(22) Filed: Sep. 28, 2007

(65) Prior Publication Data

US 2009/0089248 A1   Apr. 2, 2009

(51) Int. Cl.
*G06F 7/00* (2006.01)
*G06F 17/30* (2006.01)

(52) U.S. Cl.
USPC .......................................... 707/706

(58) Field of Classification Search
USPC ........................................ 707/102, 706; 7/102
See application file for complete search history.

(56) References Cited

U.S. PATENT DOCUMENTS

| | | | |
|---|---|---|---|
| 6,546,397 B1* | 4/2003 | Rempell | 707/102 |
| 6,750,864 B1* | 6/2004 | Anwar | 345/440 |
| 7,051,025 B2* | 5/2006 | Kan et al. | 1/1 |
| 2004/0032432 A1* | 2/2004 | Baynger | 345/810 |
| 2007/0005686 A1* | 1/2007 | Fish et al. | 709/203 |

\* cited by examiner

*Primary Examiner* — Greta L. Robinson
*Assistant Examiner* — Jeffrey Chang
(74) *Attorney, Agent, or Firm* — Farjami & Farjami LLP

(57) ABSTRACT

A system and method of filtering search results is provided. Certain embodiments provide an improved user experience in filtering large sets of data in a computer system through the use of multidimensional associative arrays which allow results to be filtered within a web interface without needing additional calls to web server or online database.

20 Claims, 14 Drawing Sheets

| RECORD_ID | ATTRIBUTE_1 | ATTRIBUTE_2 | ATTRIBUTE_3 | ATTRIBUTE_4 |
|---|---|---|---|---|
| 01 | A | G | M | P |
| 02 | B | G | M | Q |
| 03 | A | G | M | P |
| 04 | B | H | M | P |
| 05 | C | H | N | Q |
| 06 | A,C | G | N | P |
| 07 | C | H | N | Q |
| 08 | A | G | M | P |
| 09 | B | H | N | Q |
| 10 | A | G | N | P |
| 11 | B | F | M | Q |
| 12 | B | F | N | Q |

FIG. 4

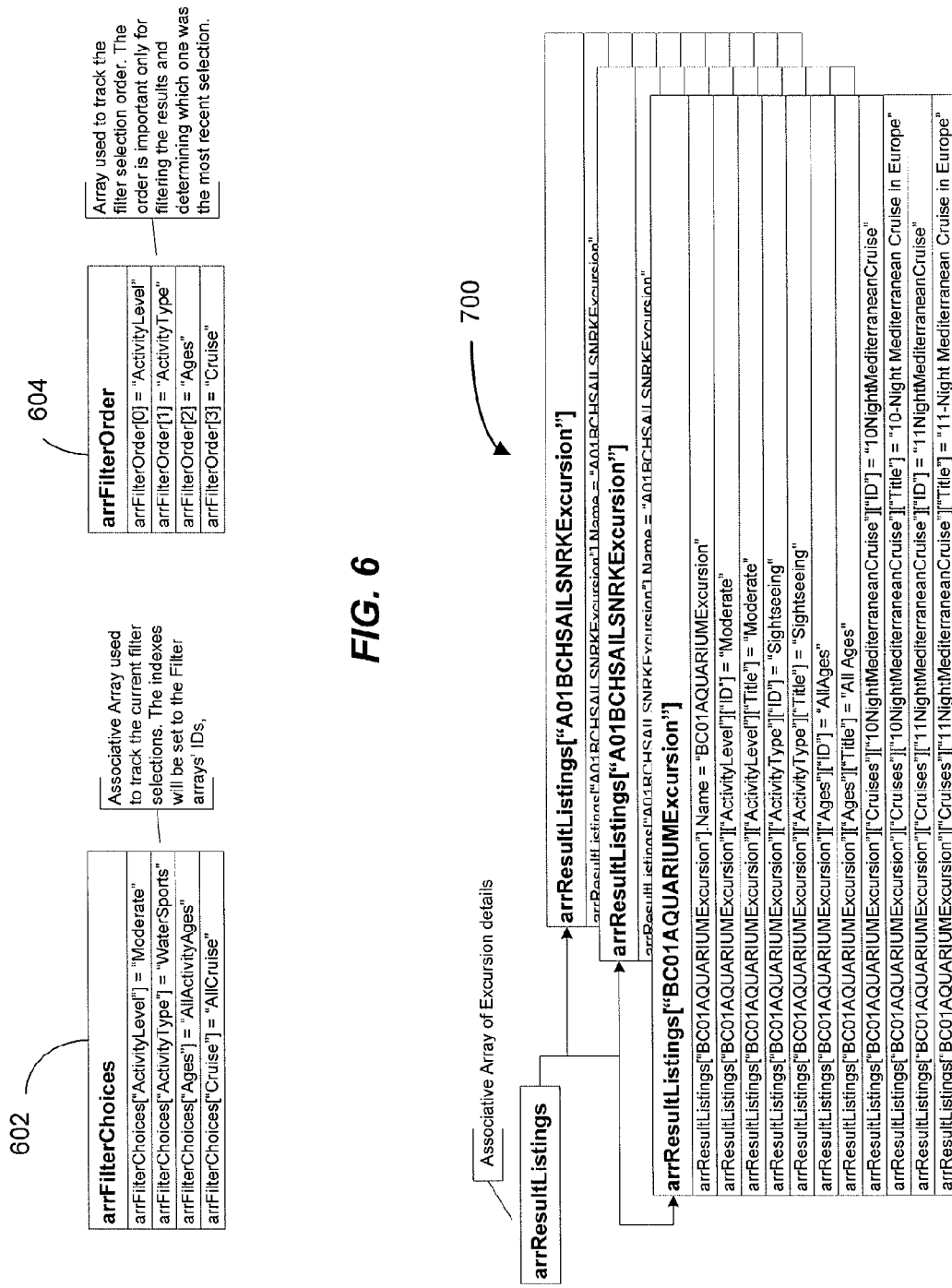

FIG. 10C

SYSTEM AND METHOD OF FILTERING SEARCH RESULTS

BACKGROUND OF THE INVENTION

1. Field of the Invention

This application relates to filtering of search results in a computer application. More particularly, this application discloses a simplified search filter which is used to filter search results in a web browser without needing to reload page data from a web server.

2. Description of the Related Art

Many web-based applications allow users to search online databases for data by submitting a search request to a web server. Search results may be returned to the user's web browser and listed for viewing. In some applications, a large number of listed results are returned and the user may wish to filter the listed results so as to lessen the number of items to scan to find the content in which they are interested. Existing search filtering systems use multi-select menus that populate which each selection. These selection menus often take the form of a series of dropdown menus which allow the user to select filtering criterion from the offered menu selections. In some implementations, the dropdown menus are positioned such that a user may first make a selection from a first dropdown menu. The system then makes a request to the server to filter the options presented in the second dropdown based on the selection in the first dropdown menu. The user then makes a selection from the second dropdown menu, and submits the filtering request to the web server (by clicking a "SUBMIT" button for example). At that point, the web browser sends an HTTP POST command to the server specifying parameters with which to filter the search results. In response, the server sends a new page having only the results that satisfy the parameters selected from the dropdown menus. Thus, each selection made by the user requires a request be made to the server and the page to be reloaded in the browser window.

SUMMARY OF CERTAIN INVENTIVE ASPECTS

In one embodiment, a search filter in a graphical user interface for filtering a record set of data is provided. The record set of data comprises a plurality of records having a plurality of attributes. The search filter comprises a filter table including a plurality of columns, each column being related to an attribute of the records in the record set, each column further displaying distinct values for attributes among the records in the record set, each of the displayed distinct values being selectable, the filter table being generated based on values stored in a first array, the first array being a multidimensional array; and a filter list comprising a listing of records, the filter list being modifiable in response to a selection of one or more displayed distinct values, the filter list being generated based at least in part on values stored in a second array.

In another embodiment, a computer-implemented method for filtering a set of data in a web browser is provided. The data set comprises a plurality of records having a plurality of attributes defined therefore. The method includes passing the plurality of record objects into a first array, the first array being a multidimensional record listing array; generating a second array comprising at least a first and second dimension, the first dimension being related to attributes of the plurality of records; and the second dimension being related to distinct values of the attributes among the plurality of records; receiving a selection of at least one of the distinct values; adding data indicative of the selected distinct value to a third array, the third array comprising array elements related to each of the attributes; comparing elements in the third array to elements in the record listing array; and displaying the elements from the record listing array having elements of the third array using cascading style sheets.

In still another embodiment, a computer-readable medium is provided having computer executable instructions stored thereon which, when transmitted to a computer having a web browser, cause the web browser to perform a method for filtering a record object in a web browser. The record object comprises a plurality of records having a plurality of defined attributes. The method includes passing the plurality of record objects into a first array, the first array being a multi-dimensional record listing array; generating a second array comprising at least a first and second dimension, the first dimension being related to attributes of the plurality of records; and the second dimension being related to distinct values of the attributes among the plurality of records; receiving a selection of at least one of the distinct values; adding data indicative of the selected distinct value to a third array, the third array comprising array elements related to each of the attributes; comparing elements in the third array to elements in the record listing array; and displaying the elements from the record listing array having elements of the third array using cascading style sheets.

BRIEF DESCRIPTION OF THE DRAWINGS

FIG. 4 is an example of a database table which includes a data set to be filtered.

FIG. 6 are examples of a filter selection array and a filter selection order array that may be used to filter records to be displayed in a user interface.

FIG. 7 is an example of a record listing array.

FIGS. 10A-10E provide examples of the operation of a browser interface in accordance with one or more embodiments.

DETAILED DESCRIPTION OF EMBODIMENTS OF THE CLAIMS

Various embodiments set forth in this specification are directed to specific embodiments which provide an improved user experience in filtering large sets of data in a computer system. However, the invention can be embodied in a multitude of different ways as defined and covered by the claims. In this description, reference is made to the drawings wherein like parts are designated with like numerals throughout.

The systems and methods described herein may be implemented in a general purpose computing environment. In one illustrative embodiment, various general purpose computing devices such as personal computers may be used to implement and run software configured to perform the methods described herein. Specialized computing devices such as computer network appliances may also be used. Other types of computing devices may also provide platforms on which the system may be run. The system may be implemented in a networked computing environment. In some embodiments a wide area network such as the Internet may be utilized to communicate information between computing devices. The system may be implemented as a thin client/server application, web-based application accessible through browsing software, or it may be implemented utilizing some other computer medium.

Figure 1:
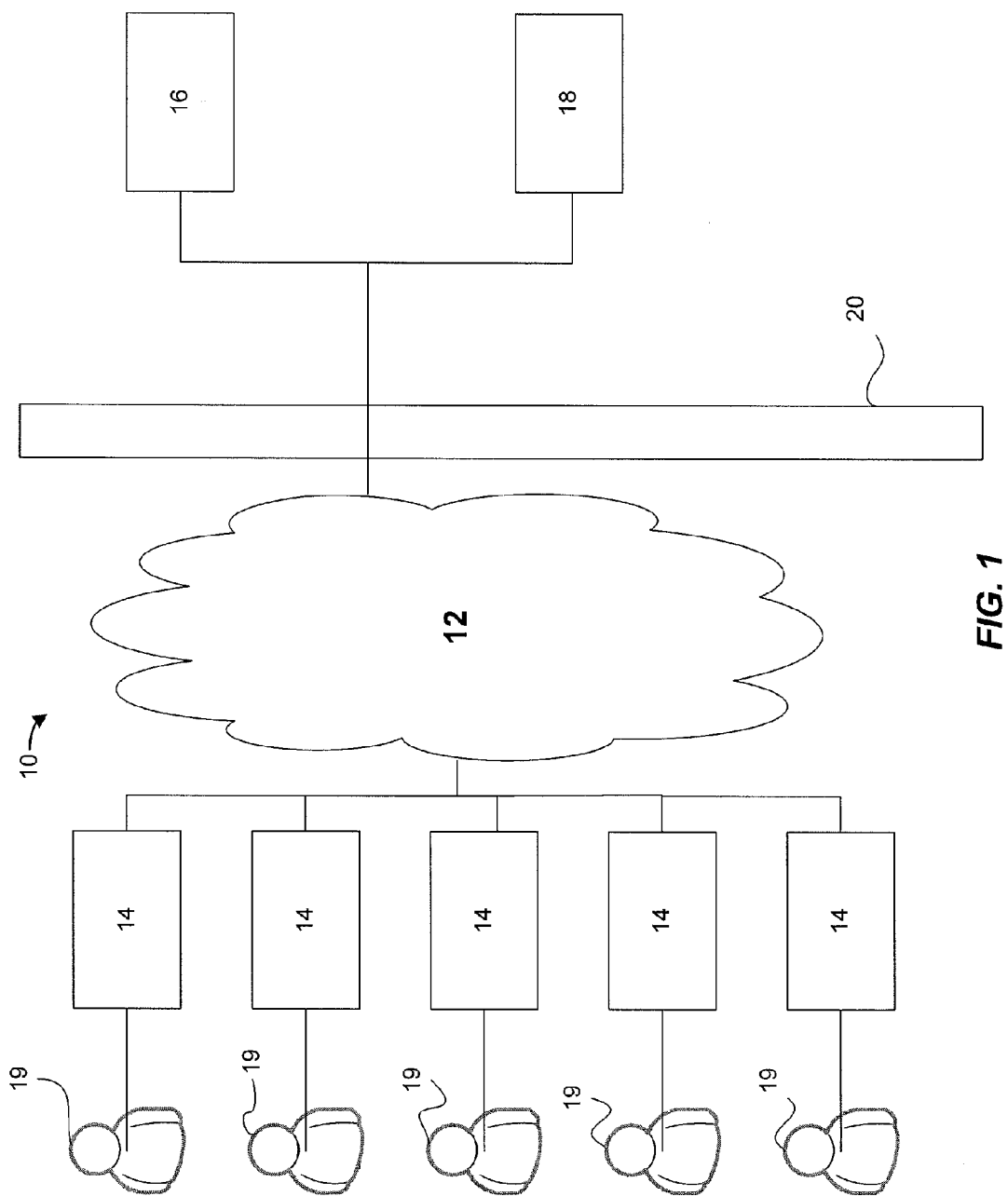
FIG. 1 is a block diagram of a network environment suitable for the implementation of various embodiments described herein.

Referring now to FIG. 1, an example of one exemplary configuration of a general purpose computing environment 10 is provided. The computing environment 10 may include one or more servers 16. In some embodiments, the servers 16 may be web servers configured to host one or more websites and one or more web applications. The servers 16 may be in communication with one or more databases 18 which store data that is used by the servers 16 to provide content to the server applications. The databases 18 may be stored on the same hardware as the servers 16, or they may reside on a separate computing device. The computing environment 10 may typically includes a network 12, which is accessed by the servers via some type of network connection interface. In some embodiments, the network 12 is a wide area network such as the Internet, for example. The servers 16 and databases 18 may be shielded from a network 12 by a firewall 20. The firewall 20 may be configured to protect the servers 16 and the database 18 from unauthorized network traffic and access attempts. In some embodiments, the servers 16 may be placed "in front" of the firewall 20, while the database 18 may remain "behind" the firewall 20 to protect sensitive data. The firewall 20 may be configured to allow appropriate traffic to pass through to the servers 16 and the database 18 in a manner well-known in the art.

Connected to the wide area network 12 may be one or more client computing devices 14 which access the Internet via a network connection. The client computing devices 14 may take various forms including, but not limited to, general purpose computers running web browsing software, notebook computers, tablet computers, personal digital assistants, cellular telephones, other handheld devices, or some other computing device capable of accessing the network 12 through a defined application programming interface. The client computing devices 14 may be operated by various users 19 to access application modules within the servers 16 and/or databases 18. Although FIG. 1 describes a particular architecture and configuration for implementation, one of skill in the art will readily appreciate that the computing environment 10 described is but one of many possible configurations that may be utilized without departing from the scope of the invention. For example, the server 16 and database 18 may reside on a single computer, or they may be distributed among several computers. Also, the firewall may be integrated into the server 16, the database 18, or even both via a separate network interface.

Figure 2:
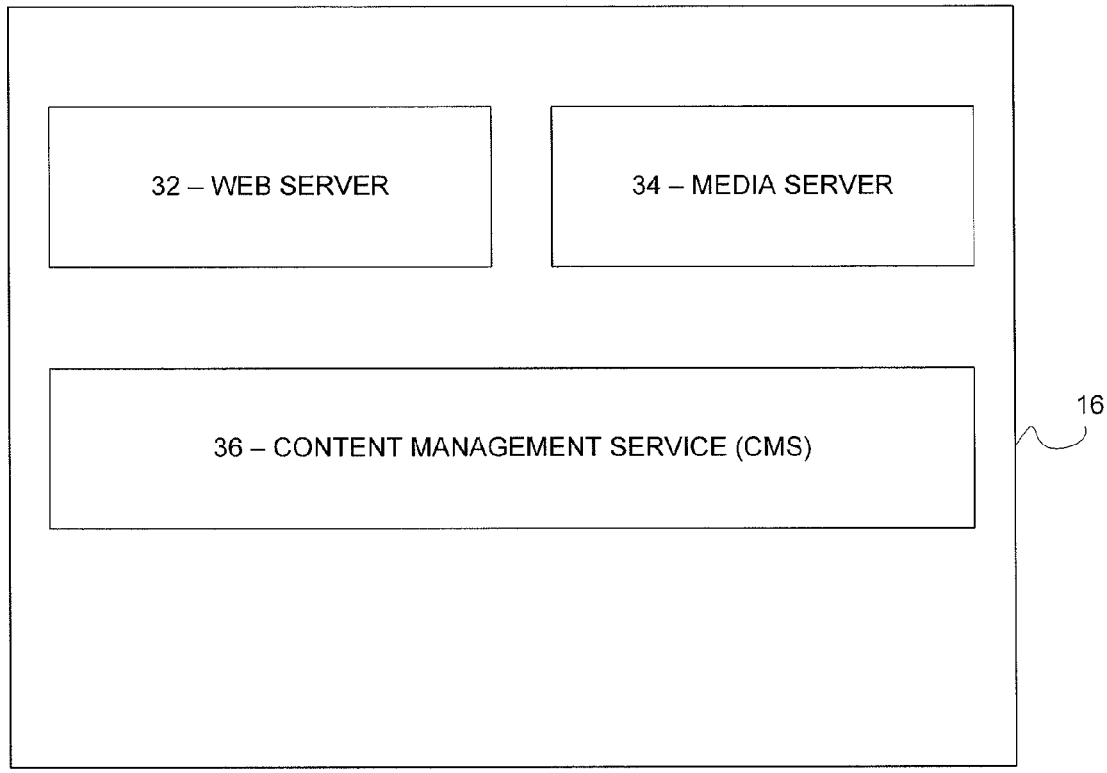
FIG. 2 is a block diagram of a web server from FIG. 1.

Referring now to FIG. 2, a more detailed diagram showing various software modules that may be included in a server 16. The server 16 may be a computer running a general purpose operating system such as Windows, MAC OS, Linux, or the like. The server 16 may include various modules as shown in FIG. 2. These modules may take the form of software, hardware, or combination of the two. One of the modules in the server 16 may be a web server 32. The web server 32 may be a commercial off the shelf web server such as Apache or IIS, or it may take the form of a more customized web serving software. As is well known in the art, the web server 32 receives requests from client computing devices 14 on behalf of users 19, and sends web page data in response to the requests. The server 16 may further include a Java engine 34 which is used to interpret and handle Java code. The Java engine may be Java virtual machine (JVM). The Java engine 34 may cooperate with the web server 32 to deliver web pages generated programmatically by code provided to the Java engine. The server 16 may further include a content management service (CMS) 36. The CMS is typically used to deliver page content to the web server 32 for transmission is response to client 14 requests. The CMS 36 may take the form of a middleware application that accesses content stored in the database 18 and provides it to the web server 32 and Java engine 34 for formatting and transmission to the client computing devices 14 over the network 12. Although FIG. 2 provides a specific example of one configuration for the server 16, a skilled artisan will readily appreciate that various configurations of for the server 16 and its associated modules may be used and that the specific example of the server 16 configuration and the network environment 10 are not intended to be limiting. Moreover, other types of files, such as JavaScript files (.js files) and/or web page images, for example, may be served from an optional media server instead of directly from the web server 32.

Figure 3:
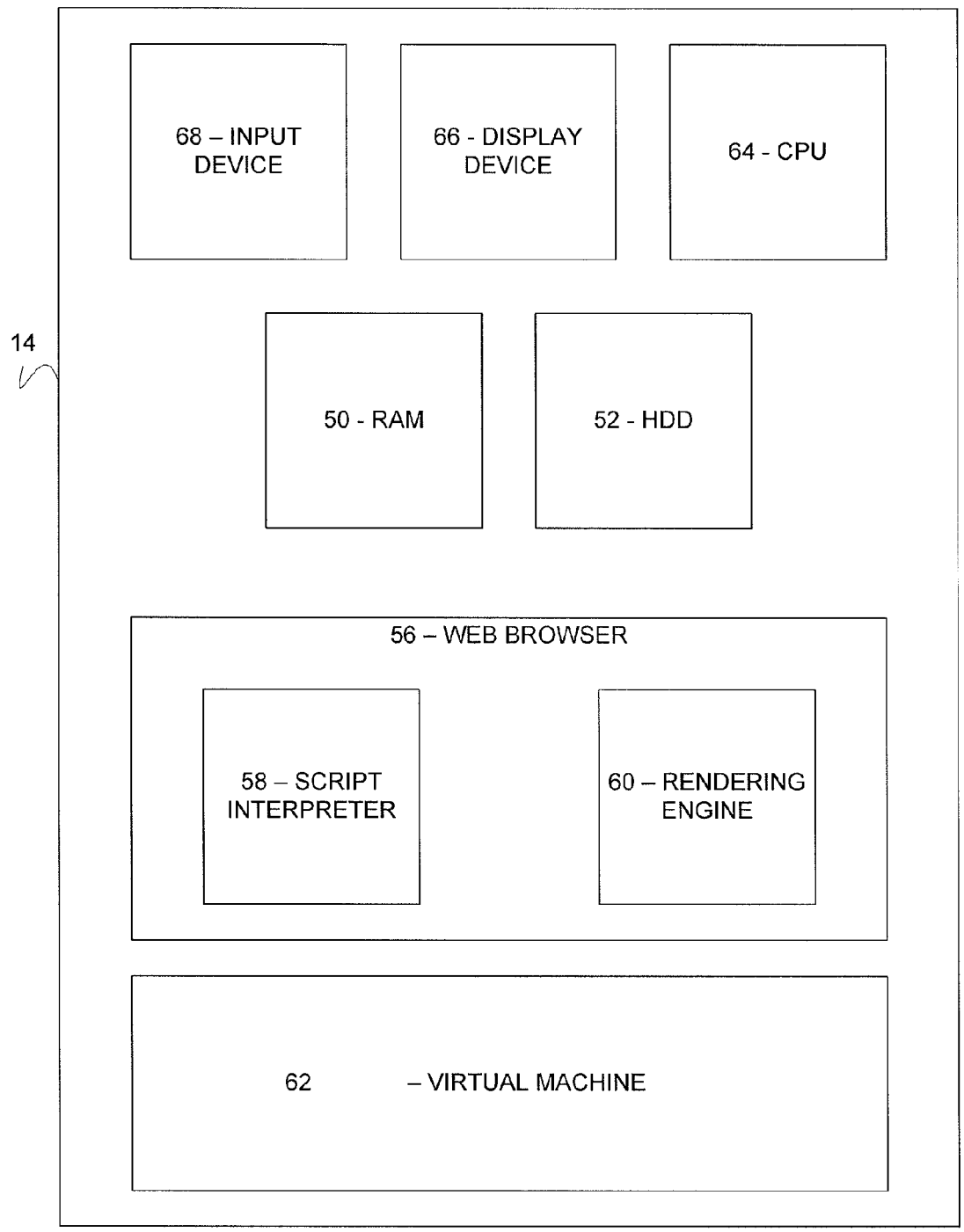
FIG. 3 is a block diagram of a client device from FIG. 1.

As noted previously, the web server 32 running on the server 16 may receive requests from client computing devices 14 and respond to those requests accordingly. With reference to FIG. 3, an example of a client computing device 14 is provided. The client computing device 14, which may take various forms, typically includes a memory such as random access memory (RAM) which stores data for quick access by a processing unit such as central processing unit (CPU) 64. The client computing device 14 may also include a non-volatile memory such as a hard disk drive 52, for example, which may be used to store application data and other types of data. Also included in a typical client computing device 14 is a web browser 56. The web browser 56 may be a commercially available browser such as Internet Explorer or Firefox which has generalized capability of accessing the Internet, or it may be a custom-developed browser with a more specific functionality or capability.

The web browser 56 may include modules which enhance the web browsing experience for the user 19 of the client computing device 14. For example, the web browser may include a script interpreter 58. The script interpreter 58 receives program files from an external source, such as web server 32, for example, and interprets the scripts into HTML and passes the HTML to a rendering engine 60. The rendering engine 60 takes the HTML and generates a web page which is displayed on a display device 66 of the client computing device 14. The script interpreter may be a JavaScript engine, a JVM, or both. The script interpreter 58 may further include other interpreters which take program code and transform it into HTML which can be understood and output by the rendering engine 60.

The client computing device 14 may further include an input device 68 (such as a keyboard, mouse, stylus, touchscreen, or one or more in combination) which allows the user to interact with and control the behavior of the web browser 56 and other software on the computing device. The client computing device may be any of various types of hardware including a personal computer, a notebook computer, a mobile phone, a tablet PC, a handheld computer, and other computing devices.

As noted previously, various embodiments described herein provide a simplified search filter which is used to filter search results in a web browser without needing to reload page data from a web server. In one embodiment, the search results may be data stored in the database 18 and provided by a content management system 36 cooperates with the web server 32 to deliver page data to the web browser 56 of a client computing device 14. Referring now to FIG. 4, an example of a database table 80 which may be used to store content displayed in the web browser 56 to the user 19. Although the example provided herein for purposes of illustration is a database table, a skilled artisan will recognize and appreciate that the data may be stored in various formats, including as a flat file, an object-oriented data structure, or some other format.

As shown in the figure, the table 80 includes a plurality of database records 82 which are organized according to the structure (also sometimes referred to as a schema) defined for the database table 80. The structure of the database includes a series of fields 84 which typically store data related to some attribute associated with the record 82. Generally, one or more of the fields will serve to uniquely identify each particular record among the records 82 in the table 80. In the example provided in FIG. 4, the RECORD_ID field 86 is the unique identifier for the records 82. Each record 82 may also include various associated attributes which are stored in one or more of the fields 84 defined in the table 80. In the example provided, the table includes four attribute fields: ATTRIBUTE_1 (88), ATTRIBUTE_2 (90), ATTRIBUTE_3 (92), and ATTRIBUTE_4 (94). The records 82 store values in each of the fields which are indicative of the attributes of the entity represented by the record 82.

In some embodiments, the values stored in the attribute fields 88-94 may be scalar values. Most of the records show in this example has atomic values in the attribute fields. However, it is possible for attribute fields in a record 82 to include multiple (scalar) values associated with the attribute. For example, in the record having the RECORD_ID value of "06", the value for ATTRIBUTE_1 includes two values delimited by a comma. The example table shown in FIG. 4 is a simplified version of a database table suitable for implementing various embodiments described herein. In practice, the database table may be much more detailed and be part of a normalized grouping of database tables in which attribute values are unique identification values which are normalized into separate database tables in a manner well-known in the art.

Various embodiments of the present application will now be described in the context of a web-based application which may be used to filter search results based on specified criteria associated with shore excursion activities provided in connection with cruise ship travel. Although this implementation is specific to a particular industry and business environment, a skilled artisan will readily appreciate that this example is merely illustrative of one particular usage scenario, and it not intended to be limiting in any respect.

In order to provide a more readily understood description of the various embodiments disclosed herein, it is useful to first describe the operation of a web browser 56 interface within the context of various embodiments described below. FIGS. 10A through 10E provide an example of a user interface for a web browser executing instructions in accordance with various embodiments described with reference to FIGS. 5-9 below.

Figure 10A:
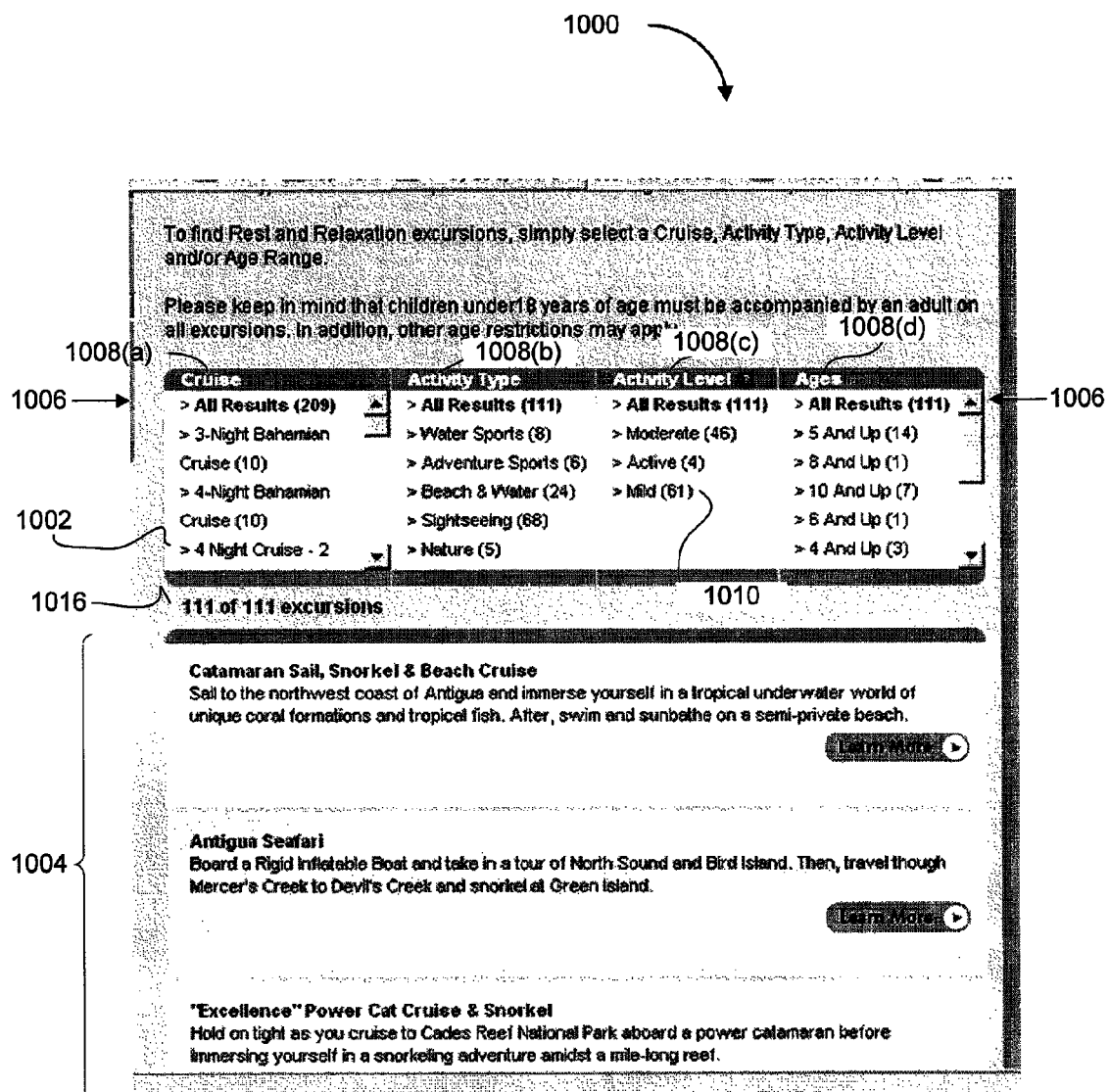

FIG. 10A provides an example of a user interface 1000 displaying database records 82 to the user 19. The interface 1000 may be a user interface from web browser 56. In this particular example, the data records 82 relate to excursions made available to cruise-goers. The user interface 1000 includes a dynamic record listing 1004. The dynamic record listing 1004 presents a listing of information related to the database records 82 from the table 80. Typically, the dynamic record listing 1004 will be initially presented as a full listing of all records 82. In the screenshot shown in FIG. 10A, the dynamic record listing 1004 lists all available cruise excursions, as indicative by the listing summary 1016 which indicates that "111 of 111 excursions" are displayed in the dynamic record listing 1004. Due to the space considerations, not all of the records are displayed in the drawing, however, it should be appreciated that the remaining records not shown can be accessed by scrolling the window display in a manner well known in the art.

Because the user 19 may have certain preferences or requirements for the items of interest, the interface includes a filtering table 1002 which allows the user 19 to selectively filter the records 82 listed in the dynamic record listing 1004 to limit the displayed records to those which meet criterion specified by the user 19. The filtering table 1002 lists various attributes about the database records 82 associated with the excursions. In this example, there are four filtering attributes which are listed in separate columns 1008: cruise 1008(*a*), activity type 1008(*b*), activity level 1008(*c*), and ages 1008(*d*). Each attribute column 1008 is configured so that the selected item in the column 1008 provides an indication of its selection. In the user interface 1000 provided in FIG. 10A, the selection of an attribute in the attribute column 1008 is indicated by boldface font. Other indicators may be used, however, such as italics, a change in background, or some other visual element.

Because FIG. 10A shows a full listing of the records, the "All Results" value 1006 (which results in no filter being applied for an attribute) for each attribute column 1008 is highlighted. Next to each selectable attribute in the attribute columns 1008 is a qualifying records indicator 1010 which indicates how many records in the currently displayed record set satisfy the selectable attribute (and as a result will be listed in the dynamic record listing 1004 if that particular attribute value is additionally selected by the user 19). Thus, if the user 19 selects "Mild (61)" in the "Activity Level" attribute column 1008(*c*), the listing summary is automatically (e.g., without requiring an additional call to the server 16), updated to read "61 of 111 excursions", and the dynamic record listing 1004 is reduced to listing the 61 records that satisfy the selected filter.

Figure 10B:
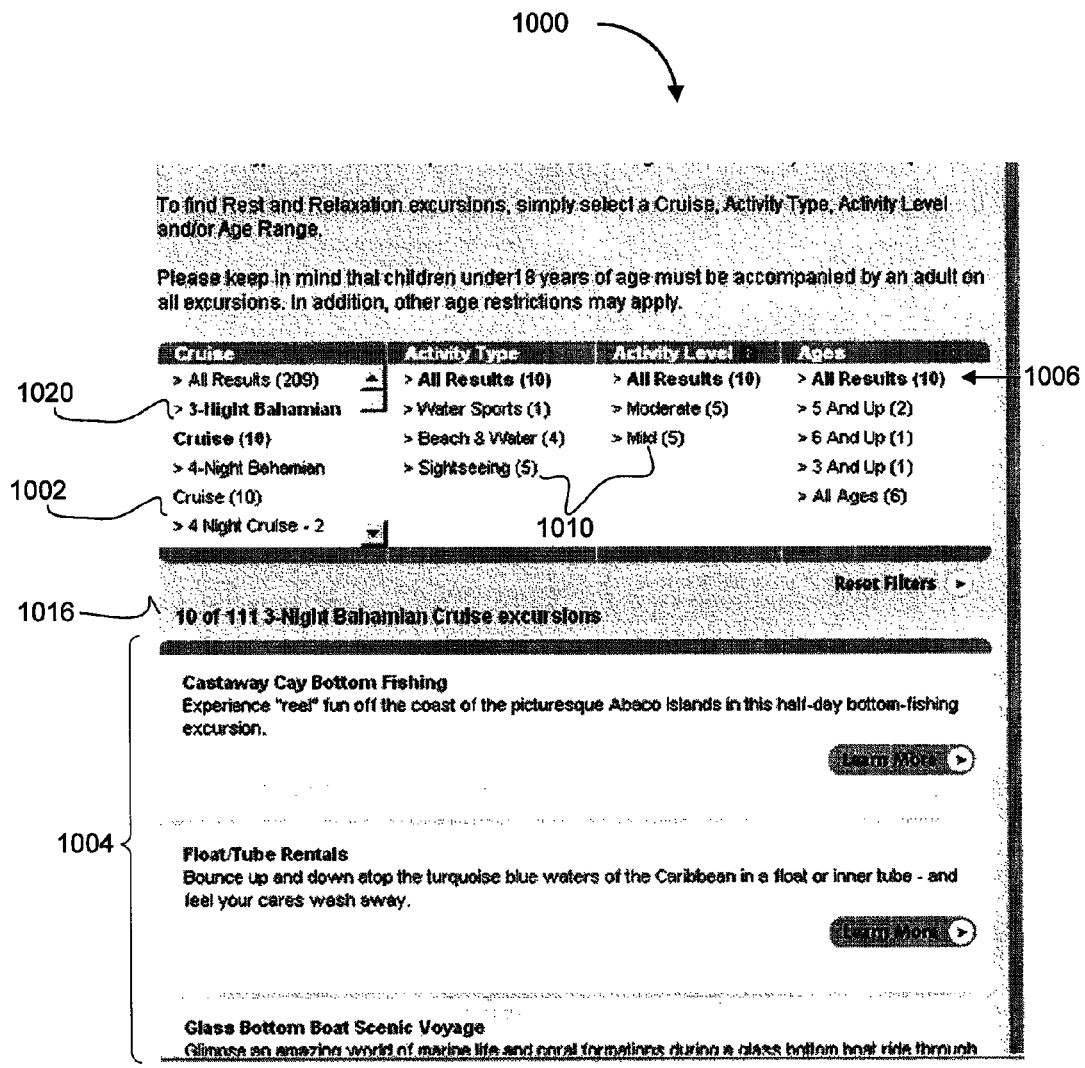

FIG. 10B shows an example how the user interface 1000 is modified in response to the user 19 selecting one of the values in the attribute columns in order to narrow the dynamic record listing 1004. As shown in the figure, a selection has been made of the of the "3-Night Bahamian Cruise" value 1020 in the "Cruise" attribute 1008(*a*), as indicated by its boldface appearance. In response to that user selection, the user interface 1000 is modified as shown. In particular, the dynamic record listing 1004 is reduced to displaying only those 10 records which meet the specified criterion, and the listing summary 1016 is updated in at least two ways to reflect the current filtering selection. First, the listing summary updates the number of records 82 displayed in the dynamic record listing 1004 ("10 of 111") as a result of the selection of the attribute value 1020. Second, the summary is updated to reflect the selection of the specific attribute value 1020 ("3-Night Bahamian Cruise"). As a result, the summary 1016 reflects that current status of the filtering process and is indicative of records 82 displayed in the dynamic record listing 1004. The selection of the attribute value 1020 also results in an automatic modification of the qualifying records indicators 1010 for the other listed attributes. The qualifying records indicators 1010 are modified so as to reveal the number of records 82 which will be displayed if the attribute value (such as "Moderate" in the Activity Level attribute column 1008(c)) associated with the qualifying records indicator 1010 is selected. For example, in the example of FIG. 10B, the user 19 may provide a further selection of "Moderate (5)" in attribute column 1008(c). In making the selection, the user 19 is able to further define the specifics of their desired excursion. The effect of such as selection by the user is illustrated in FIG. 10C.

Figure 10C:
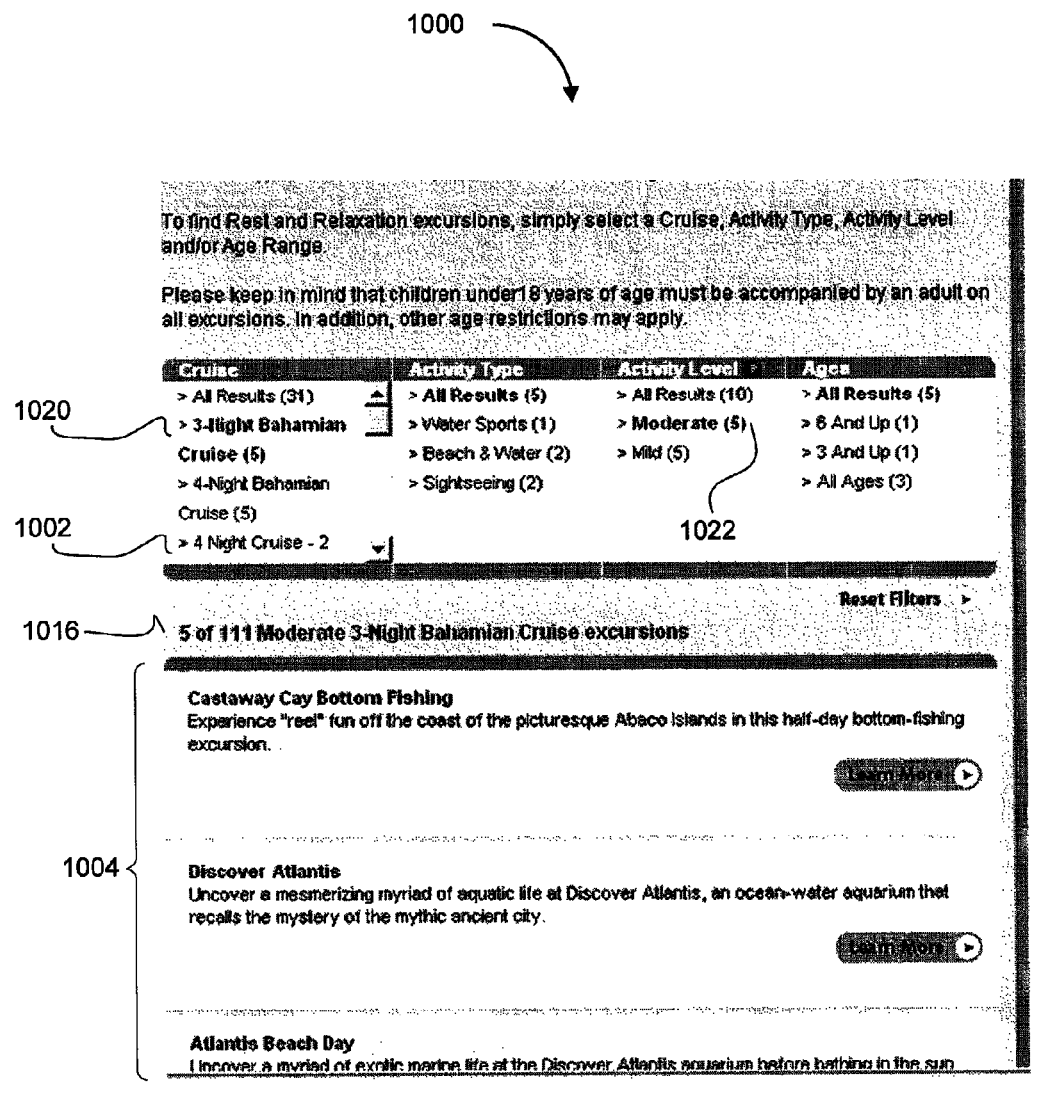

FIG. 10C shows the user interface 1000 after the user 19 additionally selected the "Moderate" activity level 1022. As was the case with the first selection of the "3-Night Bahamian Cruise" 1020, the qualifying records indicators 1010 associated with each attribute value are automatically updated in response to the second selection without needing an additional call to the server 16 or the database 18. In addition, the listing summary 1016 is further updated to reflect the additional filtering parameter 1022 selected by the user: "5 of 11 Moderate 3-Night Bahamian Cruise Excursions".

Figure 10D:
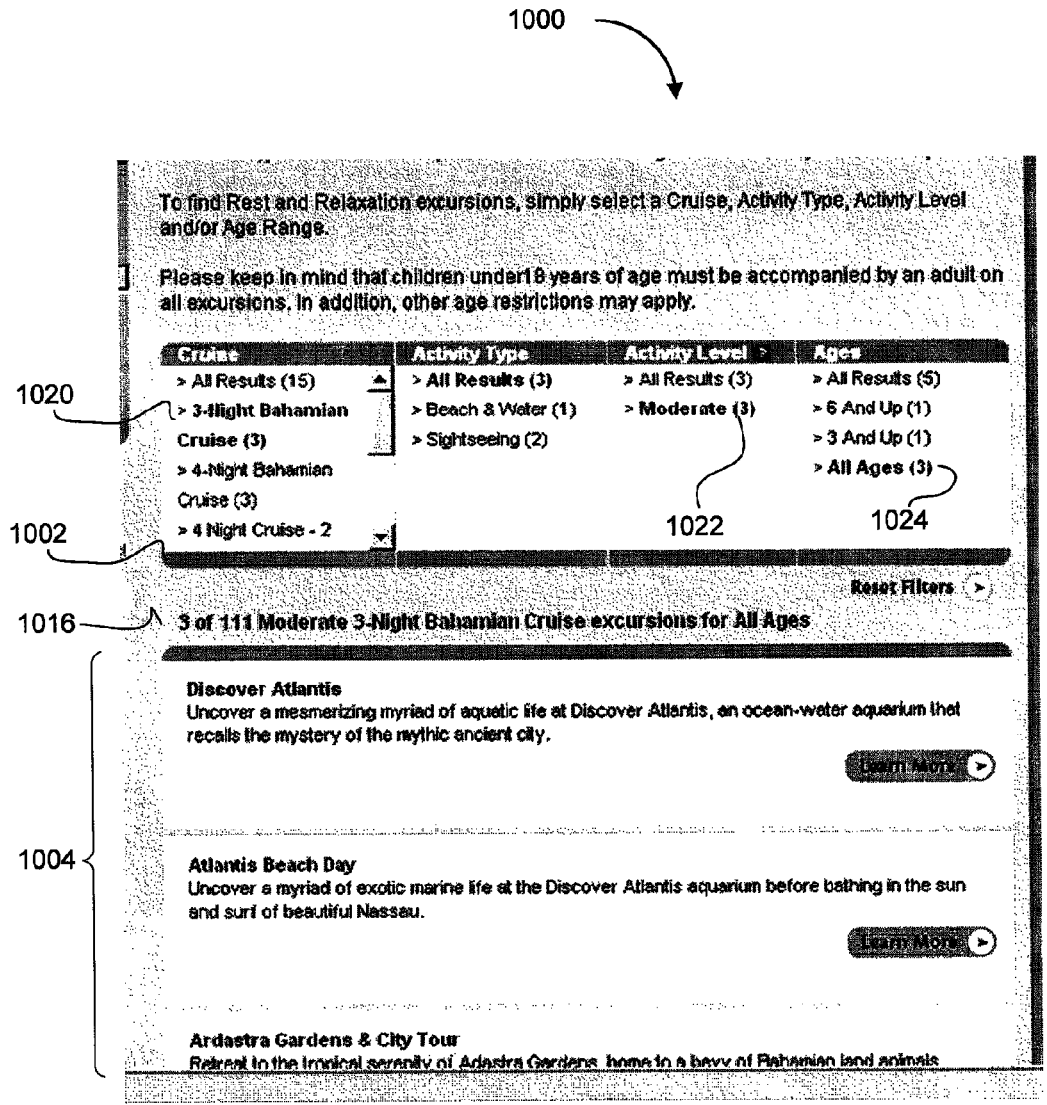
Figure 10E:
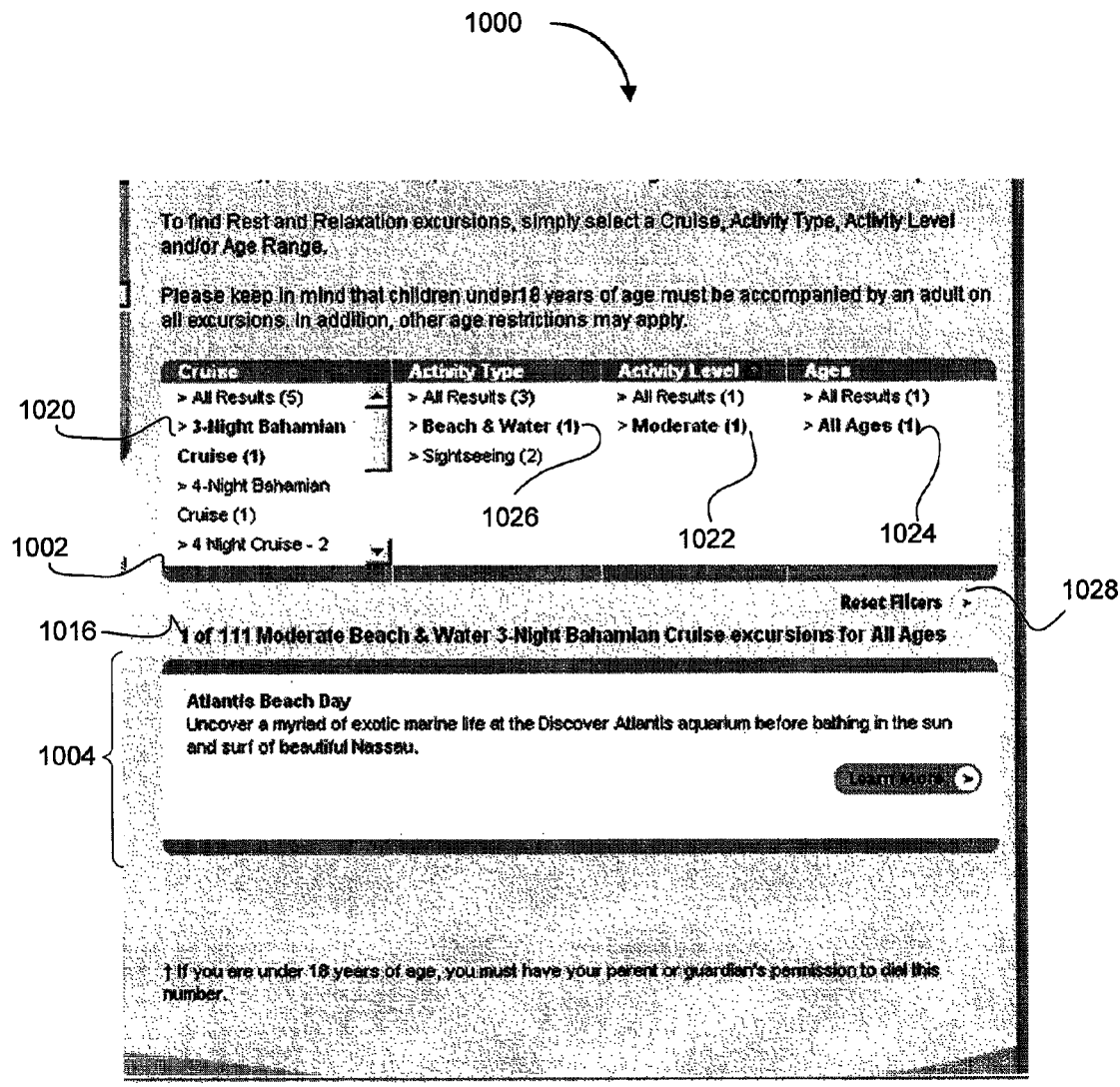

The user 19 may further refine (or broaden by selecting an "All Results" 1006 filter) the desired excursion attributes by selecting another attribute parameter value from one of the other columns 1008. Turning now to FIG. 10D, an example of the user interface 1000 generated in response to an additional selection of the "All Ages" filtering parameter 1022 is provided. As with the previous selections, the qualifying records indicators 1010 for each of the listed attributes are updated in response to the selection. In addition, the listing summary 1016 and the dynamic record listing 1004 are updated accordingly. FIG. 10E also provides a similar illustration of the user 19 further narrow the dynamic records listing 1004 by selecting the "Beach & Water" attribute 1026 from the "Activity Type" attribute column 1008(b). The dynamic records listing 1004 includes only a single record that matches the specified parameters, and the listing summary 1016 has also been updated accordingly. At any point during the process illustrated in FIGS. 10A-10E, the user 19 may select the "Reset Filters" element 1028 which removes each of the selected parameters and returns the user to the initial screen as shown in FIG. 10A.

As discussed previously, various embodiments provide systems and methods for filtering search results received from a web server 32 in a web browser 56 without needing to send additional requests over the network 12 to the web server 32. The operation of a browser interface according to various exemplary embodiments has been described above with reference to FIGS. 10A-10E. FIGS. 5-9 provide a more detailed description of how the record filtering operations are provided through the use of multidimensional associative arrays to track filters and results data, and the use of Cascading Style Sheets to show and hide the appropriate data according to the data stored in the associative arrays.

In general operation, the user interface 1000 from FIG. 10 is typically generated when a client device 14 makes a request to the web server 32 via a browser 56. In response to the request, data from the database 18 including attributes from the database records 82 are returned from the web server 32 to the web browser 56 and are placed in local variables generally stored in the memory of the client device 14. In some embodiments, the local variables are Javascript variables.

Based on the data returned by the web server 32, the web browser 56 generates a web page having at least a record listing area and a record filtering module. Initially, all database records 82 delivered from the web server 32 are displayed in the dynamic record listing 1004. As described above in connection with FIG. 10, a filtering module 1002 is displayed that allows the user to narrow the recording listing by selecting certain attribute values from the filtering module which will in turn automatically narrow the record listing to those records meeting the selected attributes. In performing these selection operations, no further requests are made from the web server 56, as all of the record display operations are handled locally by the script interpreter 58 and/or the rendering engine 60 in conjunction with other components of the web browser 56. In this way, record listings are hidden if they do not match filter values requested by the user 19 in the filtering module.

Figure 5:
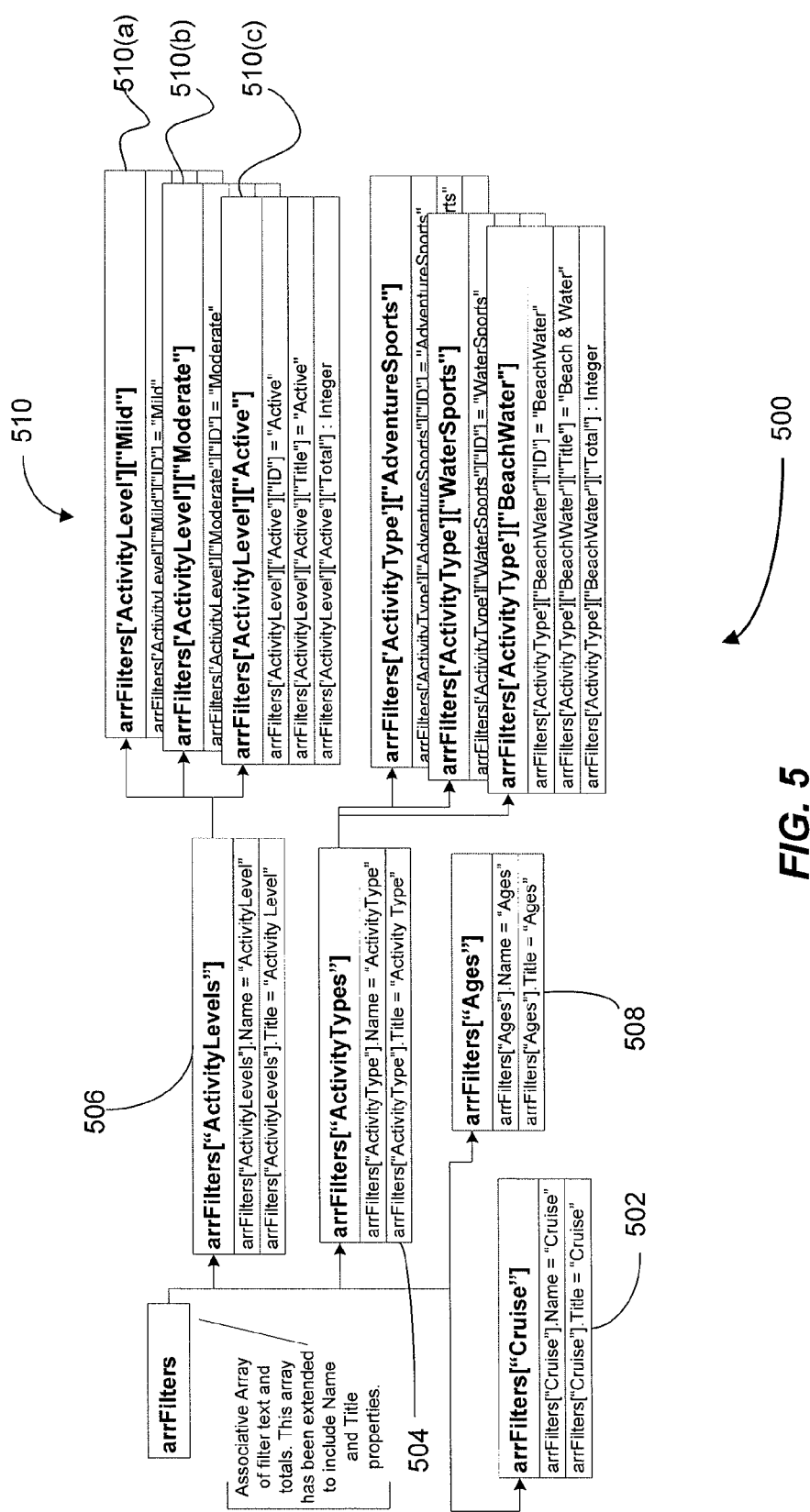
FIG. 5 is a filter text and totals array that may be used to generate a filtering table object in a user interface.

FIG. 5, an example of a filter text and totals array 500 is provided. In this illustrative example, the array 500 is an associative array and is generated in response to a user 19 requesting a page listing the records in the table 80 (from FIG. 4). When the web server receives the request it sends a request for data from the CMS 36. The CMS 36 accesses the data which is stored in database 18, typically via an SQL query and sends the data returned in response to the query to the web server 36. The SQL query may include one or more SELECT statements which return the entire data set stored in the table 80. The SELECT statements may further be configured to return certain additional information about the data. For example for each ATTRIBUTE field 88-94, the SQL may determine the distinct record values in the field, as well as the count of each of the distinct record values. These determinations may be performed by a single SQL query, or alternatively, may be performed by a series of SQL queries submitted to the database 18.

The data returned in response to the query may be written into the associative array 500 shown in FIG. 5. The associative array 500 in FIG. 5 is a multidimensional array and is given the name "arrFilters." This array may be used to create a filtering table 1002 (as shown in FIG. 10 below) which allows a user 19 to select attributes for filtering data displayed in the web browser 56. The first dimension of the associative array 500 has values which represent each of the attributes 88-94 in the table 80. Thus, in the example shown in FIG. 5, the database table 80 schema includes first dimension array values for four attribute fields: Cruise 502, ActivityTypes 504, ActivityLevels 506, and Ages 508. In this particular example, the associative array 500 is formed as an object, so the array values may be extended to include properties defined for the object. In the case of the first dimension of the associative array 500, each value is given a name property (which may be used to identify the object), and a title property (used for displaying information to a user in an easy to understand form). For example, the "arrFilters["ActivityLevels"]" object 506 may include a Name property value of "ActivityLevel" and a Title property value of "Activity Level" which is more readable for a user.

The associative array 500 may further include a second dimension which allows for specifying the distinct values for the associated with the attributes 88-94. These distinct values may be obtained in various ways. For example, a SELECT DISTINCT statement may be included in the SQL query sent to the database 18. Alternatively, the dataset returned from the database may be scanned for distinct values by the JavaScript during the initial page render. In this particular example, the database table 80 has three distinct values ('Mild', 'Moderate', and 'Active') for the attribute "ActivityLevels" 506. Accordingly, a second dimension array 510(a), 510(b), and 510(c) is generated for each of these distinct values. The second dimension array 510 may be extended to include additional information that is displayed to the user 19 in the search filter table 1002 from FIG. 10. As noted above, these associated values may be extended using object properties, or as shown in the example of "arrFilters['ActivityLevel'][ ]" 510, it may be extended using additional dimensions for the array.

The second dimension arrays 510(*a*), 510(*b*), and 510(*c*) each represent a distinct value for the ActivityLevels attribute as stored in the database table 80. Additional properties may be defined for each distinct value represented by the second dimension array. For example, for each distinct value, the total number of records 82 in the table 80 having that specific attribute value may be defined. Thus, if there are five database records 82 having an activity level of "Active", the arrFilters ['ActivityLevel']["Active"]["Total"] may be given a value of 5 to indicate that there are 5 records with an activity level attribute set to the value "Active". Although not shown in FIG. 5, additional second dimension arrays may also be defined for the first dimension arrays arrFilters["Cruise"] 502 and arrFilters["Ages"].

Turning now to FIG. 6, examples of two arrays are provided which may be used to control the behavior of the filter table 1002, its associated listing of records 1004, and record count 1016 as shown in FIG. 10 (and described in further detail below). The first associative array, is a filter selection array 602, called in this example, arrFilterChoices. This associative array may be used to track filter 1002 selections within the web browser 56 interface. When a user selects filters from the filter table 1002, the values associated with the array 602 are updated to reflect the user's selections. In some embodiments, the default values will be "All", indicating that all results are currently displayed and the user 19 has not narrowed the listing 1004 by selecting elements from the filtering table 1002. As selections of filter choices are made by the user 19, the arrFilterChoices associative array 602 is updated to reflect those choices. In this particular example, the array has been updated to reflect that the user has specified an activity level of "Moderate" 1022 from the "Activity Level" attribute column 1008(*c*) in FIG. 10. The array has been further updated in response to a user selection of the "Water Sports" attribute from the "Activity type" attribute column 1008(*b*) of FIG. 10, the values for arrFilterChoices["Ages"] and arrFilterChoices["Cruise"] have not been selected (or have been returned to the non-filtered state) as indicated by their respect assigned value in the array 602.

FIG. 6 also provides an example of an array that is used to track the filter selection order. The filter selection order array 604, called in this example, arrFilterOrder, may be used to track the filter selection order. The array typically includes an element for each attribute column 1008 which may be used as a filter in the filtering table 1002.

FIG. 7 is an example of a record listing array 700 into which records 82 retrieved from the database 18 by the CMS 32 may be placed for display in the dynamic records listing 1004 of the user interface 1000. The record listing array 700 may be generated by querying the database 18 for all of the relevant records 82. This query may be performed by the CMS 32 or some other type of middleware. The retrieved records may then be passed to either the JavaScript engine 34 on the server 16 or the script interpreter 58 on the web browser 56. Once the database records 82 have been passed, a script is executed which loops though the records to create the multi-dimensional associative array 700 shown in FIG. 7. The dynamic record listing 1004 is then generated from the data stored in the array.

Figure 8:
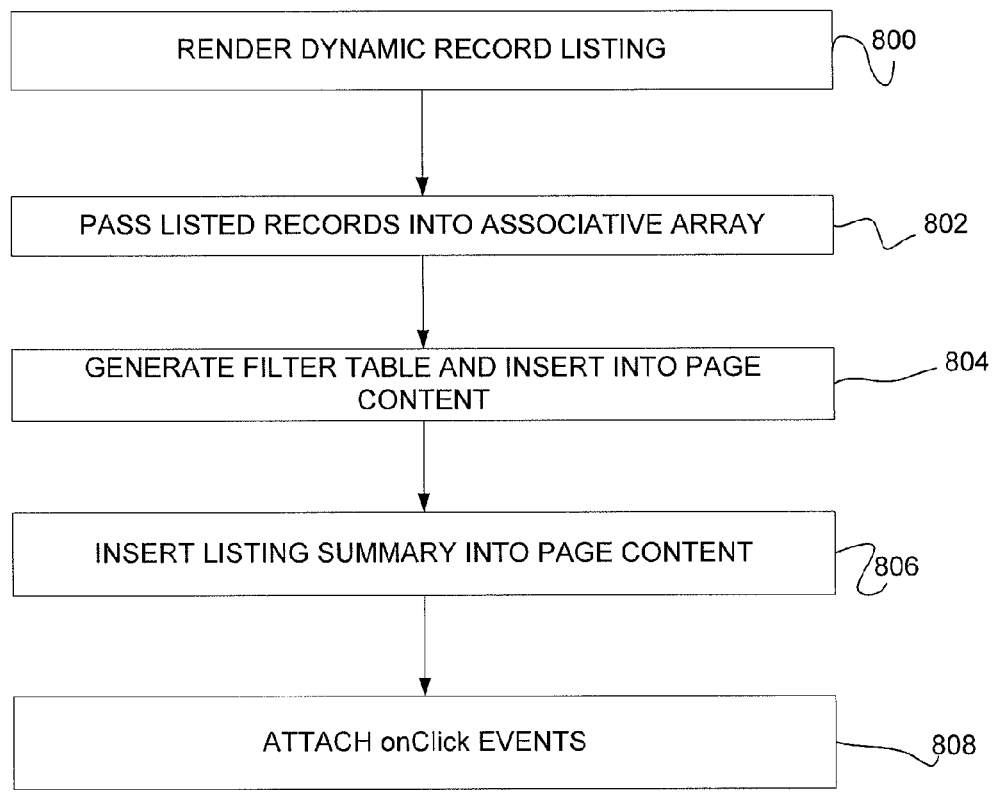
FIG. 8 is a flowchart of a user interface generation process.

FIG. 8 is a flow diagram of the how the user interface 1000 of FIG. 10 is generated in accordance with one or more embodiments. The process begins at block 800 where the dynamic record listing 1004 is rendered in the page, typically by the rendering engine 60 of the browser 56. Next, at block 802, the records listed in the dynamic record listing 1004 are passed into the associative array 700. As noted above, the associative array 700 is used to store the data so that it may be compared with the filtering attribute values 1008 selected from the filtering table 1002. The process then moves to block 804, where filter table 1002 is generated and placed into the user interface 1000 content. As noted previously, the filter table may be generated utilizing the filter text and totals associative array 500 described in connection with FIG. 5 above. Next, the process moves to block 806, where the listing summary 1016 is inserted into the page. The listing summary 1006 is initially generated to indicate that all available records are displayed in the dynamic record listing 1004. This is because when the user interface 1000 is initially generated within the browser, no selection of filtering attributes has been made by the user 19. Once the basic page elements have been generated and included in the user interface 1000, the process then moves to block 808 where the "onClick" events are attached to the various user interface elements. The "onClick" events govern the behavior of the user interface 1000 when a selected interface element (such as an value in attribute columns 1008) is actuated by the user 19.

Figure 9A:
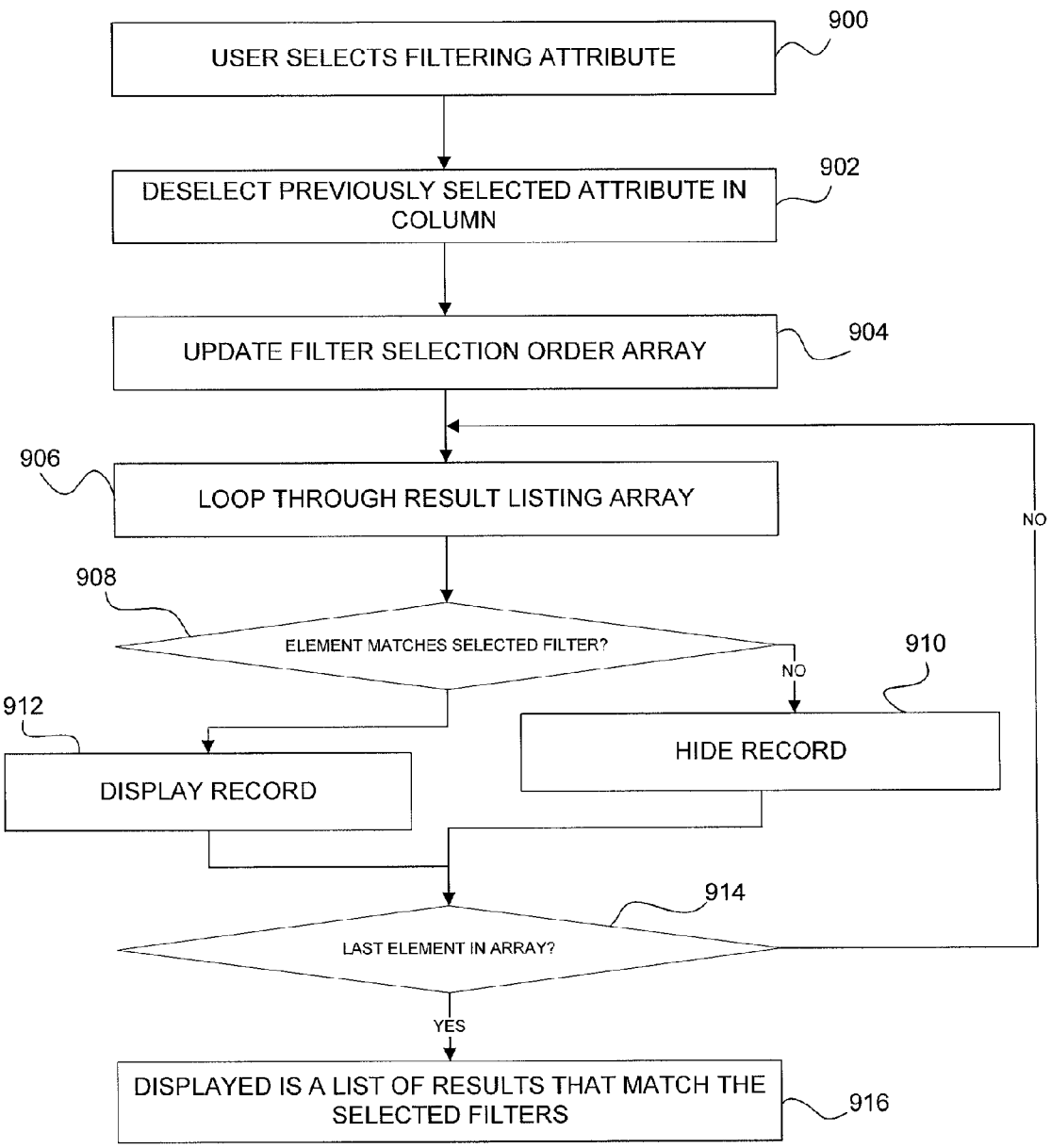
FIG. 9A is a flowchart depicting a process for filtering of the search results.
Figure 9B:
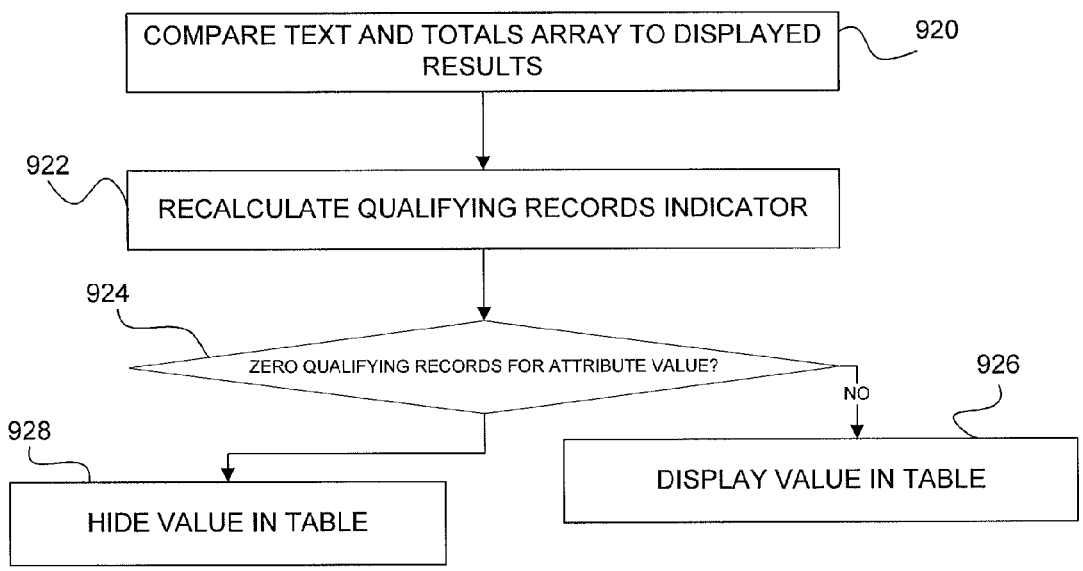
FIG. 9B is a flowchart that depicting a process for updating of a filter table.

FIGS. 9A and 9B are flow diagrams of the record filtering process which takes place in response to an "onClick" event. The process begins at block 900 when the user 19 selects a filtering attribute 1008 in the user interface 1000. In response to this "onClick" event, the previously selected attribute in the column is deselected at block 902. Next, at block 904, the filter selection order array 604 is updated to reflect the user's selection. The process then moves to block 906 where the process begins looping through the result listing array 700 (using a "while" loop or "for each" loop, for example), and the array elements are compared to the selected filters at decision block 908. If the first array element does not match the selected filters 1008, then the record 82 is hidden in the dynamic record listing 1004 using a property defined in a cascading style sheet (or some other property in the document object model for the page) at block 910. If at decision block 908, the record 82 matches the selected filters, then the record 82 is displayed in the dynamic record listing 1004 at block 912. Next, the process moves to another decision block 914, where it determines whether the most recent record 82 is the last array element in the result listing array 700. If not, the process continues to loop through blocks 908 through 914 until the last array element is processed and the process moves to block 916 where the non-hidden records are displayed in the dynamic record listing 1004.

FIG. 9B illustrates the how the filter table 1002 is updated in the user interface 1000. Although the updates to the filter table 1002 are shown as following the updates to the data used to generate the dynamic record listing 1004, a skilled artisan will appreciate that this specific order of events is not required. The updates to the filter table may precede the updates to the dynamic record listing 1004. The process begins at block 920, where the text and totals array 500 is accessed by the browser 56. Based on the filter 1008 selected by the user 19 within the browser interface, the qualifying records indicator 1010 is re-calculated for each attribute value at block 922. At decision block 924, if the qualifying records indicator 1010 is zero for a particular filter it is hidden from view at block 926. If the qualifying records indicator for the filter is not zero, then the filter and its total remain displayed in the filter table 1002 at block 928.

While the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description.

What is claimed is:

1. A method of displaying at least a portion of a record set of data, the record set of data comprising a plurality of records having a plurality of attributes, the method comprising:
displaying, in a first portion of a screen, a filter table including a plurality of columns, each column being related to an attribute of the plurality of records in the record set of data, each column further displaying distinct values for the attribute among the plurality of records in the record set of data, each of the displayed distinct values being selectable by a user via an input device, each column further displaying a qualifying record indicator corresponding to a number of the plurality of records matching the distinct value, the filter table being generated based on values stored in the first array, the first array being a multidimensional array;
displaying, in a second portion of the screen, a filter list comprising at least a portion of the plurality of records in the record set of data, the filter list further displaying an updated qualifying records indicator corresponding to the at least the portion of the plurality of records, the filter list being modifiable in response to a selection of one or more displayed distinct values, the filter list being generated based at least in part on values in a second array, wherein the filtering occurs within a client web browser.

2. The method of claim 1, wherein the first array comprises a multidimensional associative array.

3. The method of claim 2, wherein the multidimensional associative array comprises a first dimension having elements associated with attributes of the plurality of records in the record set of data.

4. The method of claim 3, wherein the multidimensional associative array comprises a second dimension having elements associated with the attributes of the plurality of records in the record set of data.

5. The method of claim 4, wherein the multidimensional associative array comprises a third dimension having elements associated with properties of the attributes.

6. The method of claim 1, wherein the second array is an associative array configured to store data indicative of user selections of the displayed distinct values.

7. The method of claim 1, wherein modifications to the filter list in response to the selection of one or more of the displayed distinct values do not utilize a call to an external database.

8. The method of claim 1, wherein displaying the filter table further comprises displaying at least one qualifying records indicator element associated with one of the displayed distinct values, the qualifying records indicator being indicative of a number of records to be displayed in the filter list if upon selection of the displayed distinct value.

9. The method of claim 8, wherein the qualifying records indicator is associated with one of the displayed distinct values, and wherein the qualifying records indicators are modified based on a selection of one of the displayed distinct values.

10. The method of claim 1, further comprising displaying a listing summary including data indicative of the record set of data listed in the filter list, wherein the listing summary is based at least in part on values stored in the first array and the second array.

11. A computer-implemented method for filtering a set of data in a client web browser, the set of data comprising a plurality of records having a plurality of attributes defined therefor, the method comprising:
passing the plurality of records into a first array within the client web browser, the first array being a multidimensional record listing array;
generating a second array comprising at least a first and second dimension, the first dimension being related to attributes of the plurality of records; and the second dimension being related to distinct values of the attributes among the plurality of records;
displaying the second array with a qualifying record indicator corresponding to a number of the plurality of records matching the distinct value;
receiving a selection of at least one of the distinct values;
adding data indicative of the selection to a third array, the third array comprising array elements related to the attributes;
comparing the array elements in the third array to the plurality of attributes in the multidimensional record listing array;
displaying records from the multidimensional record listing array having the attributes of the third array
updating the qualifying records indicator based on the third array.

12. The method of claim 11, further comprising hiding records from the multidimensional record listing array not having the attributes of the third array.

13. The method of claim 11, wherein the comparing comprises recursively looping through the first array to identify the records having the attributes in the third array.

14. The method of claim 11, wherein the multidimensional record listing array is a JavaScript array.

15. The method of claim 11, further comprising modifying the second array based on the selection related to the distinct value.

16. A non-transitory computer-readable medium having computer executable instructions stored thereon which, when transmitted to a computer having a client web browser, cause the client web browser to perform a method for filtering a record object in the client web browser, the record object comprising a plurality of records having a plurality of attributes defined therefor, the method comprising:
passing the plurality of records into a first array within the client web browser, the first array being a multidimensional record listing array;
generating a second array comprising at least a first and second dimension, the first dimension being related to attributes of the plurality of records; and the second dimension being related to distinct values of the attributes among the plurality of records;
displaying the second array with a qualifying record indicator corresponding to a number of the plurality of records matching the distinct value;
receiving a selection of at least one of the distinct values;
adding data indicative of the selection to a third array, the third array comprising array elements related to the attributes;
comparing the array elements in the third array to the plurality of attributes in the multidimensional record listing array;
displaying records from the multidimensional record listing array having the attributes of the third array
updating the qualifying records indicator based on the third array.

17. The non-transitory computer-readable medium of claim 16, further comprising hiding records from the multidimensional record listing array not having the attributes of the third array.

18. The non-transitory computer-readable medium of claim 16, wherein the comparing comprises recursively looping through the first array to identify the records having the attributes in the third array.

19. The non-transitory computer-readable medium of claim 16, wherein the multidimensional record listing array is in a JavaScript array.

20. The non-transitory computer-readable medium of claim 16, further comprising modifying the second array based on the selection related to the distinct value.

* * * * *